Patented Dec. 26, 1933

1,940,714

UNITED STATES PATENT OFFICE 1,940,714

PREPARATION FOR STORAGE BATTERIES AND PROCESS OF MAKING THE SAME

Eugene A. Giard, La Grange, Ill., assignor, by mesne assignments, to Vesta Consolidated Incorporated, a corporation of Delaware No Drawing. Application December 11, 1929
Serial No. 413,431

9 Claims. (Cl. 136—26)

This invention relates to a preparation for storage batteries and to a process of making such preparation.

It is an object of this invention to provide a process of making a preparation that can be used in connection with storage batteries, and more particularly the negative plates, for increasing their life and efficiency.

It is a further important object of this invention to provide a process for treating wood and woody substances to obtain a preparation for use with storage batteries.

Other and further important objects of this invention will become apparent from the following description and appended claims.

It has heretofore been suggested that lignin may be incorporated in the paste containing the lead oxides used in making storage battery plates with good results as to the efficiency of the storage battery. Such beneficial results have been attributed to various causes, among them that wood or lignin particles incorporated into the oxide mixture imparts greater porosity to the paste, thereby permitting more uniform sulphation of the oxides throughout the mass of the paste. I have now found that other substances than lignin which may be derived from wood give equally beneficial results.

In general, my process comprises treating wood or woody substances with a caustic alkali solution of such strength and at a sufficiently elevated temperature for such period of time as to dissolve certain ingredients of the wood without substantially attacking the lignin content. The substances that may be so dissolved from the wood are apparently resinous or gummy in their nature, since they are almost completely soluble in alcohol.

Although many different kinds of wood may be treated in accordance with my process, for economical reasons, I prefer to derive my preparation for use with storage batteries from the wood separators usually used in making the storage batteries.

It is usual practice to subject such separators to a cleansing treatment prior to their use in the storage battery. I therefore accomplish two objects by using separators as the source of my active substances in place of using wood of some other character.

According to my process, the separators are subjected to treatment with, say, a 3 to 5% solution of caustic soda at boiling temperature for approximately six hours under atmospheric pressure. Such treatment is not analogous to the well known soda process for making pulp, since its action is much less drastic and does not result in any appreciable dissolving of the lignin content of the separators. After the caustic alkali treatment, the solution thus formed is neutralized with acid, as for instance sulphuric acid, to effect a precipitation of the substances extracted from the wood by the alkali treatment. The liquor containing the precipitated suspended solids may be used directly in making up the battery plate paste as so much water before the addition of the strong sulphuric acid; or, the precipitated substances may be separated from the solution, as by filtration, and used in making up the paste for the plates. I have found that it is not necessary to wash the precipitated substances prior to their incorporation in the oxide mixture used in preparing the plates.

The percentage of the precipitated substances that may be satisfactorily incorporated with the oxide mixture may vary widely but in general, I prefer to use about 1 to 4% of the precipitated substances.

It will be understood that the nature of the precipitated substances is not entirely known to me, except that they appear to comprise largely the gum and resins of the wood. That they do not contain any appreciable quantity of lignin is apparent from the fact that they are almost entirely soluble in alcohol.

The result of the use of my active substances in a storage battery is to increase materially the efficiency of the battery. For instance, a storage battery in which 3% of the precipitated substances had been incorporated in the paste on the negative plate showed a negligible falling off in the capacity of the negative plates, as determined through cadmium voltage readings, during discharge after ten cycles; whereas in a similar battery operated under the same conditions but not containing my preparation, the negative plates showed a marked falling off in capacity.

I am aware that numerous details of the process may be varied through a wide range without departing from the principles of this invention, and I, therefore, do not purpose limiting the patent granted hereon otherwise than necessitated by the prior art.

I claim as my invention:

1. The process of making a preparation for use in storage battery plates, which comprises subjecting wood separators to treatment with a caustic alkali solution of such strength and at a sufficiently elevated temperature to dissolve alkali soluble constituents of the wood without dissolving substantial quantities of lignin, acidifying the resulting solution to effect a precipitation, recovering the precipitated substances and mixing said substances with the lead oxides of which the plates are formed.

2. The process of making a preparation for use in storage battery plates, which comprises subjecting wood separators to the action of a weak caustic alkali solution at about its normal boiling point, acidifying the solution thus formed to effect a precipitation, recovering the precipitated substances and mixing said substances with the lead oxides of which the plates are formed.

3. The process of making a preparation for use in storage battery plates, which comprises boiling a wooden separator with approximately a 3% caustic alkali solution, acidifying the resulting solution to effect precipitation of dissolved substances and recovering and mixing said substances with the lead oxides of which the plates are formed.

4. The process of making a preparation for use in storage battery plates, which comprises subjecting wood separators to treatment with a caustic alkali solution of such strength and at a sufficiently elevated temperature to dissolve alkali soluble constituents of the wood without dissolving substantial quantities of lignin, neutralizing with acid and mixing the resulting liquor containing precipitated and dissolved substances with the lead oxides of which the plates are formed.

5. A preparation for storage battery plates, comprising lead oxide and solid substances dissolved from wood by treatment with a hot, 3 to 5% solution of caustic alkali, and precipitated by subsequent neutralization of said alkali with an acid, said substances containing no substantial quantity of lignin.

6. A preparation for storage battery plates, comprising oxide of lead containing, in amounts not to exceed 4% alkali soluble substances dissolved from wood by treatment with a 3 to 5% solution of alkali and precipitated by subsequent neutralization of the alkali with an acid, said substances containing no substantial quantity of lignin.

7. The process for making a preparation for use in storage battery plates, which comprises subjecting wood to treatment with a hot 3 to 5% solution of caustic alkali to dissolve alkali soluble constituents of the wood without dissolving substantial quantities of lignin, acidifying the resulting solution to effect a precipitation, recovering the precipitated substances and mixing said substances with the lead oxides of which the plates are formed.

8. The process for making a preparation for use in storage battery plates which comprises subjecting wood to the action of a 3 to 5% caustic alkali solution at about its normal boiling point, acidifying the solution thus formed to effect a precipitation, recovering the precipitated substances and mixing said substances with the lead oxides of which the plates are formed.

9. The process of making a preparation for use in storage battery plates, which comprises subjecting wood to treatment with a hot 3 to 5% solution of caustic alkali to dissolve alkali soluble constituents of the wood without dissolving substantial quantities of lignin, neutralizing with acid and mixing the resulting liquor containing precipitated and dissolved substances with the lead oxides of which the plates are formed.

EUGENE A. GIARD.